No. 886,422. PATENTED MAY 5, 1908.
C. S. SHARP.
CULTIVATOR.
APPLICATION FILED AUG. 29, 1907.
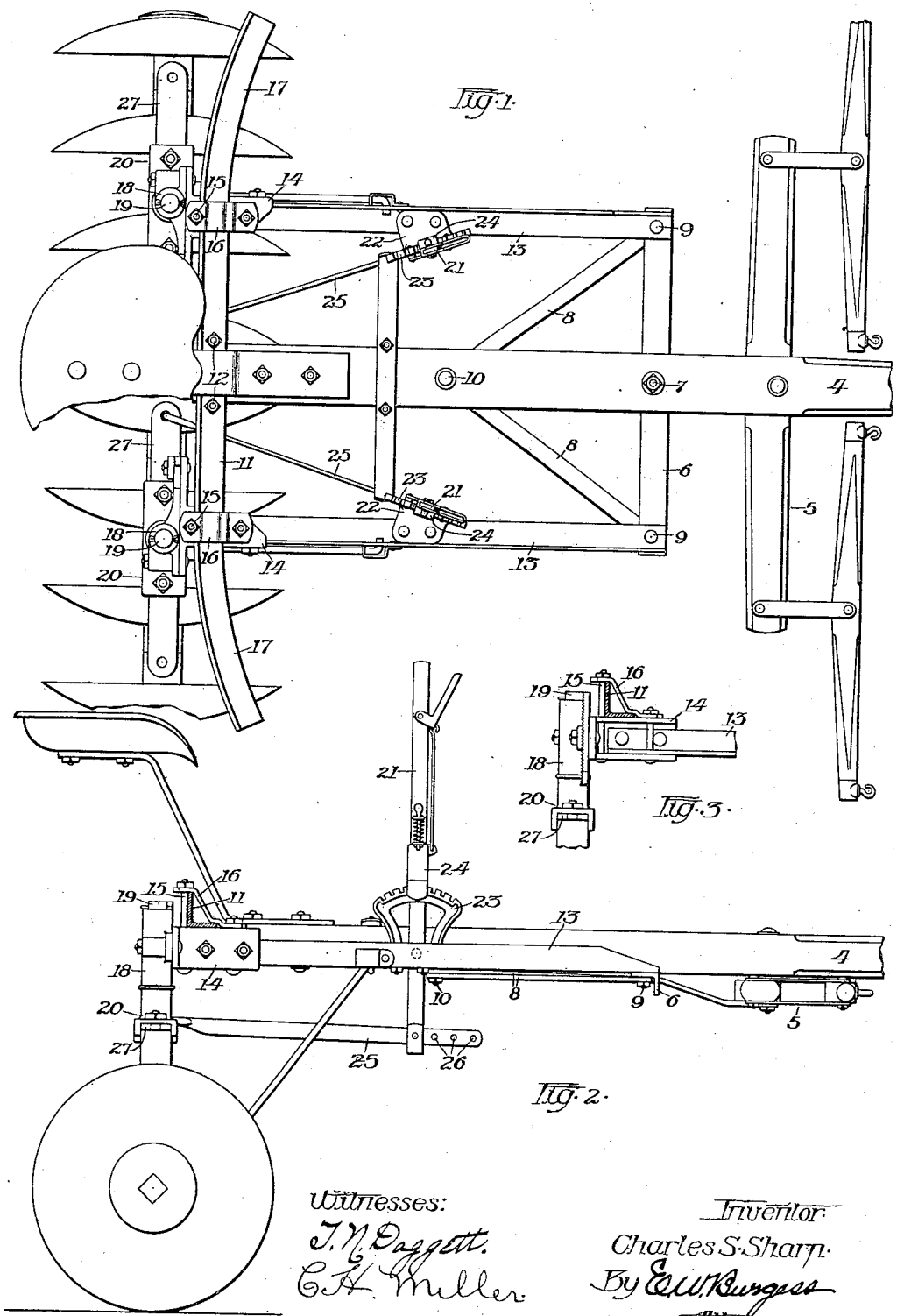

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

CULTIVATOR.

No. 886,422.     Specification of Letters Patent.     Patented May 5, 1908.

Application filed August 29, 1907. Serial No. 390,580.

*To all whom it may concern:*

Be it known that I, CHARLES S. SHARP, a citizen of the United States, residing at Auburn, in the county of Cayuga and State of New York, have invented certain new and useful Improvements in Cultivators, of which the following is a specification.

My invention relates to improvements in cultivators, and is particularly adapted to that class of disk cultivators having what are usually called reversible gangs pivotally mounted in a manner permitting said gangs to be adjusted at varying angles with the line of draft thereof; and also so mounted that the gangs may be adjusted laterally toward or from a medial line parallel with said line of draft; and the objects of my improvement are to provide a mechanism for controlling the movement of said gangs that will be both simple and strong in construction; and also to provide a draft frame structure upon which said mechanism is mounted in a manner to be conveniently operated. I attain these objects by the mechanism illustrated in the accompanying drawings, in which—

Figure 1 is a top plan view of a disk-cultivator embodying my invention; Fig. 2 is a side elevation of Fig. 1; and Fig. 3 is a detail of part of the specific mechanism.

Like reference numerals designate the same parts throughout the several views.

Referring to the drawings, 4 represents a tongue having the draft eveners 5 connected thereto; 6 represents a front frame member secured intermediate its ends to the tongue by means of the bolt 7, said member being arranged at substantially right angles with the line of draft, and 8 represents inwardly and rearwardly inclined braces having their forward ends secured to the outer ends of the frame member 6 by means of bolts 9, and their rear ends to said tongue by means of a bolt 10. A rear frame member 11 is secured to the rear end of the pole by means of bolts 12, having its central portion substantially parallel with the front frame member, and 13 represents frame members arranged upon opposite sides of said tongue in the direction of the line of draft, having their front ends pivotally connected with the outer ends of the member 6, the securing means being preferably the bolts 9. Secured to the rear ends of the members 13 are brackets 14, which brackets are adjustably secured to the under side of the member 11 by means of bolts 15 and clips 16; the outer portions 17 of the bar 11 are formed concentric with the pivotal connections of the members 13 with the member 6; and 18 represents brackets secured to the rear face of the brackets 14, and having vertically arranged bearings adapted to receive the stems 19 that form a part of gang frames 20, upon which the disk gangs are suitably mounted, the frames being mounted in a manner to turn about the axes of the stems.

For the purpose of adjusting the angularity of the disk gangs relative to the line of draft, there is mounted upon each of the frame members 13 a hand lever 21, by means of brackets 22 secured to said members, and having toothed sectors 23 integral therewith; the hand levers being pivotally connected with the brackets and provided with a common form of spring pressed detent 24 adapted to engage with the toothed sector in the well-known way for the purpose of retaining the lever in any position of adjustment, the lower end of each lever being pivotally connected with the forward end of a link 25 by means of a pin that may be received by any one of a series of openings 26 in said link, the rear end of the link being pivotally connected with the inner end of a bar 27 forming part of the gang frame, the gangs being reversible by turning them through a half revolution about their axes in the well-known way; the links 25 being adapted to connect with either end of said bar.

The gang frames may be adjusted toward or from a medial line by adjusting the brackets 14 on the frame member 11.

What I claim as my invention, and desire to secure by Letters Patent, is:

1. A cultivator having in combination, a draft frame, said draft frame having front and rear rigid members arranged at right angles with the line of draft, draft members having their forward ends pivotally connected with the outer ends of said front member, brackets secured to the rear ends of said pivoted draft members and adjustable longitudinally along said rear member, said brackets having other brackets secured against their rear faces, disk gang frames having vertically arranged stems, said stems being journaled in said second named brackets, and lever mechanism adapted to adjust said gang frames at varying angles relative to their line of draft, said lever mechanism being mounted upon said pivoted draft members and connected with said disk gang frames.

2. A cultivator having in combination, a draft frame, said draft frame having front and rear rigid members arranged at right angles with the line of draft, draft members having their forward ends pivotally connected with the outer ends of said front member, brackets secured to the rear ends of said pivoted draft members and adjustable longitudinally along said rear member, said rear member having the portions engaging with said brackets formed concentric with the axes of said pivoted draft members, said brackets having other brackets secured against their rear faces, disk gang frames having vertically arranged stems, said stems being journaled in said second named brackets, and lever mechanism adapted to adjust said gang frames at varying angles relative to their line of draft, said lever mechanism being mounted upon said pivoted draft members and connected with said disk gang frames.

CHARLES S. SHARP.

Witnesses:
WILLIS L. GOODRICH,
C. J. HICKOK.